73-175 SR
5/6/86 OP 000,056

United States Statutory Invention Registration [19]

[11] Reg. Number: H56
[45] Published: May 6, 1986

Chandler et al.

[54] FLOW MEASUREMENT DEVICE

[75] Inventors: Thomas C. Chandler; Howard C. Heimberger; Thomas C. Patten, all of Florissant, Mo.

[73] Assignee: The United States of America as represented by the Secretary of the Air Force, Washington, D.C.

[21] Appl. No.: 661,834

[22] Filed: Oct. 17, 1984

[51] Int. Cl.[4] ..... G01F 15/18; G01F 15/00
[52] U.S. Cl. ..... 73/195; 73/198; 248/58
[58] Field of Search ..... 73/113, 114, 195, 196, 73/198

[56] References Cited

U.S. PATENT DOCUMENTS

| | | | |
|---|---|---|---|
| 1,552,119 | 9/1925 | Davis | 73/114 |
| 2,270,141 | 1/1942 | Potter | 73/861.92 X |
| 2,586,060 | 2/1952 | Kronberger | 73/202 |
| 2,929,248 | 3/1960 | Spenkle | 73/198 X |
| 3,083,570 | 4/1963 | Truman | 73/195 |
| 3,686,947 | 8/1972 | Maeshiba | 73/861.92 |
| 3,733,898 | 5/1973 | Yamamoto et al. | 73/198 |
| 3,739,761 | 6/1973 | Niles . | |
| 3,772,915 | 11/1973 | Stamler . | |
| 4,142,413 | 3/1979 | Bellinga | 73/198 |
| 4,280,360 | 7/1981 | Kobayashi et al. | 73/198 |
| 4,304,125 | 12/1981 | Newman et al. | |

FOREIGN PATENT DOCUMENTS

| | | | |
|---|---|---|---|
| 1487394 | 7/1967 | France | 73/195 |

*Primary Examiner*—S. C. Buczinski
*Assistant Examiner*—Linda J. Wallace
*Attorney, Agent, or Firm*—Donald J. Singer; Bobby D. Scearce

[57] ABSTRACT

A device for measuring fuel flow to a power plant such as a turbo fan engine with a very high degree of accuracy, for example, ±0.5%. A tubular flow loop having quick disconnect fittings for detachably connecting the loop between the aircraft fuel system outlet and the engine fuel inlet is disclosed. Two specially calibrated mass flow transmitters are arranged in series, each preceded by a straight section of piping having a preferred given length to diameter ratio. Preceding each of the two straight pipe sections is a honeycomb flow straightener and three in-series perforated plates for removing any effects of upstream flow characteristics from the transmitters.

33 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLOW MEASUREMENT DEVICERIGHTS OF THE GOVERNMENT

The invention described herein may be manufactured and used by or for the Government of the United States for all governmental purposes without the payment of any royalty.

BACKGROUND OF THE INVENTION

The following invention relates generally to devices which measure the flow rate of fuel to an engine. More particularly, a flow loop is provided immediately preceding the fuel intake of an aircraft engine, the loop having first and second mass flow measuring devices which are averaged periodically and provide a visual display for a technician who is in the process of trimming fuel usage on the particular aircraft engine.

Mistrim of the total fuel flow in an F 15/F100 or F 16/F100 engine can cause engine augmentor blowouts, hard lights, stalls, and stagnations. With respect to overtrim, premature augmentor liner distress can also occur; in the event of undertrim augmented thrust is reduced.

To insure reliable augmentor operation, augmentor liner durability and performance, the engine manufacturer (Pratt & Whitney Aircraft) has defined a requirement to trim the F 100 engine total fuel flow to an accuracy of ±0.5%. Current systems provide an estimated accuracy of ±2.5% to 6.5%. Thus, a strong need exists to trim aircraft engines with the accuracy delineated hereinabove to preclude the possibility of mistrim as set forth above.

The practice of placing flow meters in pipe lines supplying liquid is quite common. However, the known techniques can be characterized in that they are either relatively inaccurate or when having the requisite accuracy, are too dependent on parameters not readily controlled in any place other than a laboratory setting. For example, whereas high accuracy volumetric flow meters are available, these engines consume fuel on a mass basis and therefore conversion to mass flow is necessary. The conversion process requires a density measure of the fluid and cognizance of the temperature dependence of the system, rendering a conversion procedure difficult unless performed with stringent controls not readily available in the field.

OBJECTS AND SUMMARY OF THE INVENTION

Accordingly, this invention has an objective the provision of a new and novel flow measurement device.

It is another object of this invention to provide a device as characterized above which is readily removably installable just prior to the conventional fuel intake of the engine, that is, the "teeing-in" of the measurement system into an already existing fuel system while not compromising the accuracy of the flow measuring device thus interposed.

It is yet another object of this invention to provide a device as characterized above which can be installed on either side of an aircraft.

It is a further object of this invention to provide a device as characterized above which can achieve ±0.5% mass flow measurement accuracy without difficult supporting measurements of such quantities as fuel specific gravity.

It is a still further object of this invention to provide a device as characterized above which has built-in system redundancy and self treating so that the accuracy of the mass flow measurement device according the instant application can be continuously monitored in use respectively for its own accuracy and internal integrity.

More particularly, an instrumentality has been provided in which the normal flow path from the onboard fuel storage area is interrupted immediately preceding the engine by "teeing-in" a flow loop which incorporates two calibrated mass flow transmitters in series, each transmitter preceded by an instrumentality for assuring minimal upstream flow condition sensitivity with respect to straight flow and eddies. The system consists in one form as a loop of substantially U-shaped configuration having a bight portion and first and second legs, extremities of which are provided with quick disconnect couplings to plumb into the existing fuel line. Thus, fuel flows into the inlet through one of the legs. Immediately preceding the bight portion a first flow transmitter is provided which benefits from a length to diameter ratio of the leg of at least ten. The bight portion includes a thermocouple for bias calibration, an instrumentality for draining the loop in an expeditious manner, and the return leg of the loop is provided with a second flow transmitter immediately upstream of the exit coupling. Instrumentalities are provided in the legs of the U-shaped flow loop to render uniform the flow characteristics at each flow meter. An instrumentality is provide which averages readings obtained in each flow meter as a function of time, and a deviation of each meter from the average is also displayed for assuring the integrity of the system.

A particular object includes providing an instrumentality which comprises a flow path, a mass flow transmitter disposed in said flow path, and means for altering a pattern of fluid flow in a section of said flow path immediately preceding said transmitter, whereby fluid entering said transmitter is substantially constant in flow rate and uniform in character to provide accurate flow measurement.

A further object includes providing an instrumentality as set forth immediately above which assists in trimming fuel flow in an aircraft engine or the like by monitoring fuel mass flow rate just prior to introduction into the engine comprising in combination: a flow loop provided with means for removable connection to an existing engine fuel line so that said flow loop is interposed in said fuel line, fuel flow measuring means in said loop reflecting fuel mass flow rate admitted to the engine to aid in engine trimming, and means for standardizing fuel flow characteristics upstream of said fuel flow measuring means.

A further object includes providing an instrumentality as set forth immediately above which includes a mounting bracket for a fuel flow measuring device comprising in combination: first and second portions, means for interconnecting said portions, said first portion of inverted U-shaped configuration including means for depending from an aircraft structure, said second portion including shackle means for constraining said device thereto.

A further object includes providing an instrumentality as set forth immediately above which includes a method for trimming an aircraft engine with respect to fuel use including the steps of: interposing a flow loop in the normal fuel flow path to the engine, providing the flow loop with a pair of flow measuring devices, standardizing the flow rate and characteristics of fuel upstream each flow measuring device, averaging the reading of the pair periodically, and displaying the obtained average.

A further object includes an instrumentality as set forth immediately above which includes in a fuel trimming device for an engine: display means adjacent the engine reflecting engine mass flow rate and means operatively connected to said display means and removably connected to a source of fuel supplied to and immediately preceding the engine for monitoring the mass flow rate.

The objects stated above and other related objects will become evident when considering the following detailed specification when taken in conjunction with the appended drawing figures.

DETAILED DESCRIPTION OF THE PREFERRED EMBODIMENT

Figure 1:
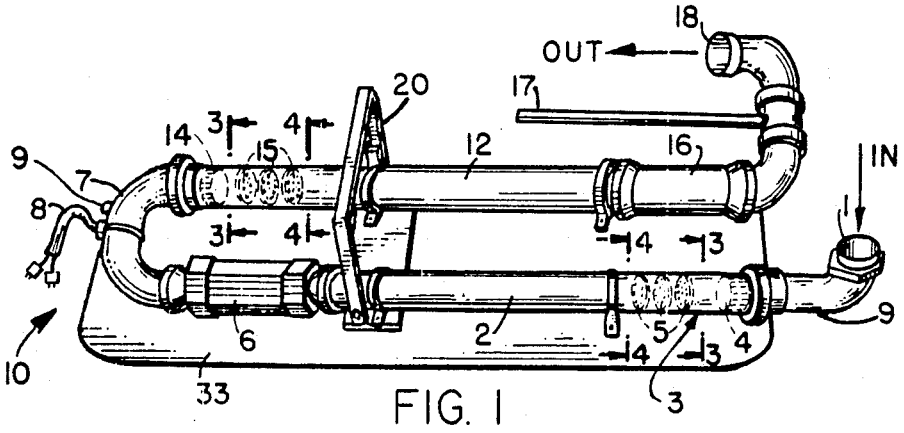
FIG. 1 is a perspective view of the flow loop apparatus according to the present invention.
Figure 2:
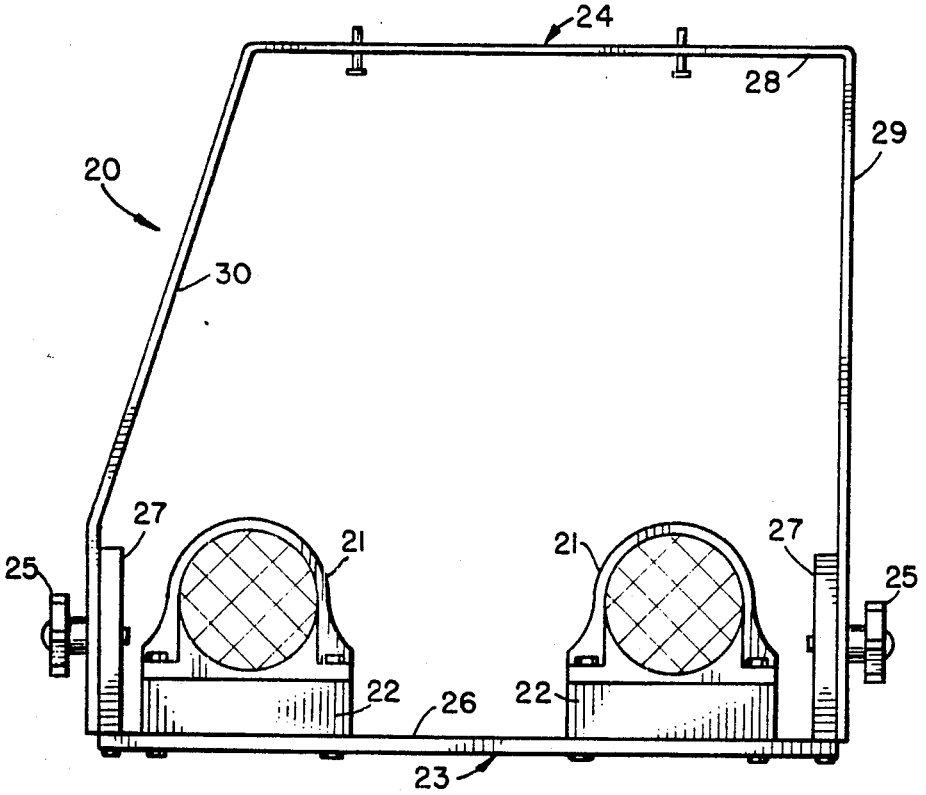
FIG. 2 is an end view of the support bracket associated with the flow loop for expeditious and facile installation and removal of the device from the aircraft.

Referring now to the drawings, wherein in like reference numerals refer to like parts throughout the various drawing figures, reference numeral 10 is directed to the mass flow measurement device according to the present invention.

More particularly, the mass flow measuring device 10 includes an inlet 1 defined as a production quick connect coupling and is preferably provided with an "O"-ring to enhance sealing. It should be equally clear that the inlet coupling can be a flanged coupling, a threaded coupling with an associated gasket or "O"-ring, or a biased typed sleeve coupling having a spring and ball detent as is known in the connector art.

Figure 3:
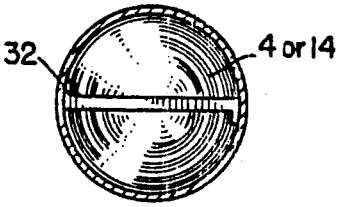
FIG. 3 is a sectional view taken along lines 3—3 of FIG. 1.
Figure 3A:
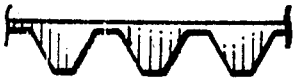
FIG. 3A shows a portion of a component of FIG. 3 removed from the loop and unraveled.
Figure 4:
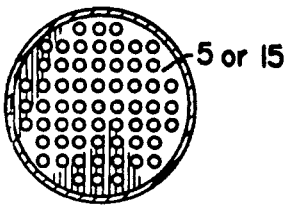
FIG. 4 is a sectional view taken along lines 4—4 of FIG. 1.
Figure 5:
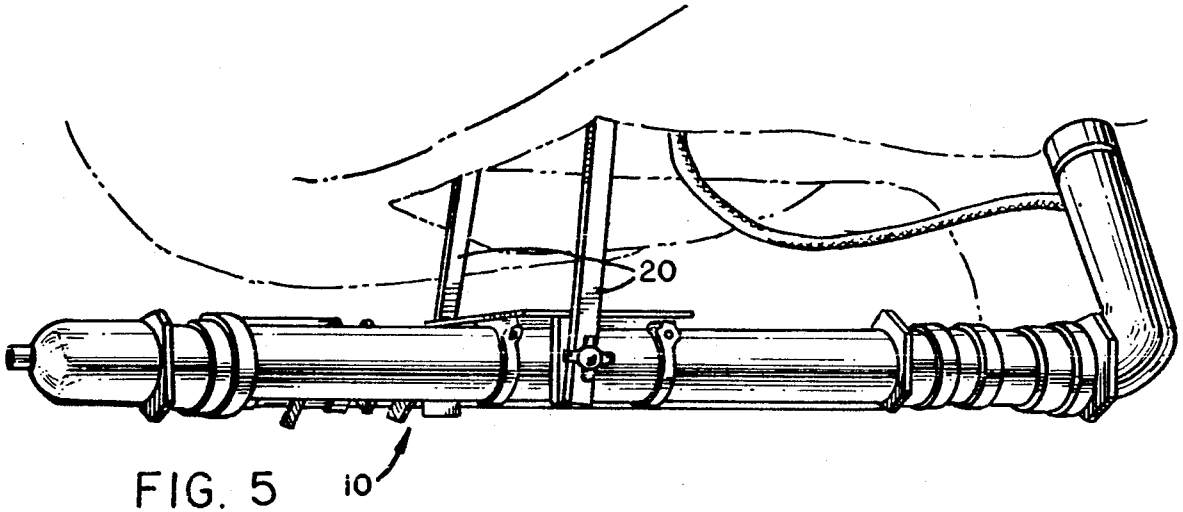
FIG. 5 is a side view of the apparatus disposed in situ.

The inlet 1 allows fluid communication with a flow loop having a substantially U-shaped configuration when viewed from a top plan view thereof. More particularly, the inlet 1 communicates with a first leg 2 which is substantially linear, circular in section, and precedes a first transmitter 6 located immediately adjacent a bight portion 7 of the mass flow measurement device 10. The first leg 2 is formed as a straight section and preferably has a length to diameter ratio of at last 10 so that fuel flow therein is substantially linear along its length. To augment and enhance the substantially linear flow, a first flow straightener 3 has beeen provided at a distal end of the first leg remote from the first transmitter 6 and nearer the inlet. As shown in FIGS. 3 and 4, the first transmitter 6 is preceded by a straight section three inches in diameter and 30 inches long to provide a length to diameter ratio of 10. At the entrance to the straight leg section 2, a cylindrical honeycomb flow straightener 4 is provided. The straightener reduces velocity profile effects and relieves the associated instrumentalities from any upstream influences that may exist. The honeycomb is rolled to form a spiral. When fabricated prior to rolling and insertion into the leg 2, a rectangular blank is used which in section (FIG. 3A) has a serpentine corrugated configuration. Once placed in the leg 2, it is fixed in position by a strap 32 to prevent rotation. Downstream of the honeycomb straightener, three perforated plates 5 are spaced one from the other at a linear distance corresponding to the diameter of the pipe so that two mixing chambers are provided between the plates. The three plates act as turbulence generators to provide more uniform inlet flow conditions to the flow meter.

Downstream of the first transmitter 6, the bight portion 7 of the flow loop is provided with at least one drain plug 9 and, in a preferred form, dual redundancy temperature sensors embodied as thermocouples 8 for monitoring fuel temperature. The bight portion 7 thereafter communicates with the second leg 12 of the mass flow measurement device 10, the second leg including a second flow straightener 13 similar to the flow straightener 3 associated with the first leg. More particularly, the second leg 12 has, at an end adjacent the bight portion 7, the second flow straightener set including the cylindrical honeycomb 14 and three perforated plates 15 which are spaced one from the other by one pipe diameter.

Figure 6:
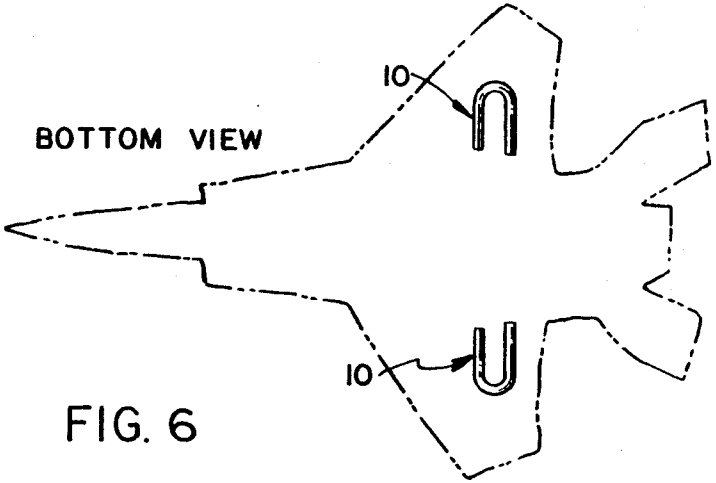
FIG. 6 is a bottom plan view schematically showing the apparatus on either side of the aircraft.

A distal end of the second leg 12 remote from the bight portion 7 is equipped with a second flow transmitter 16. Downstream of the second transmitter is an outlet 18 adapted to be received by a fuel intake conduit immediately preceding the engine. The outlet 18 includes a quick disconnect coupling similar to the production coupling of the inlet 1. Each section of the loop preceding inlet 1 and outlet 18 may include swivels and seals for orienting the device 10 on both sides of the aircraft (FIG. 6). Each fuel flow transmitter 6 and 16 is a known production type transmitter manufactured by General Electric bearing part number 8TJ62GCA3. Briefly, the flow meter yields a synchro angle output that is proportional to the mass fuel flow and is generally converted to pounds per hour units. These outputs can be readily observed on an angle readout device and can thereafter be electronically averaged and converted to mass flow units.

The perforated plates 5 and 15 as shown by the sectional view 4 have a plurality of apertures designed to pass fifty percent of the available flow therebeyond at any given time. That is to say, the plate defining the apertures cover 50% of the total area of the available cross sectional area.

Immediately downstream from the second flow transmitter and preceding the outlet 18, a cooling tap and associated flexible line 17 is provided to supply fuel for cooling the Engine Electronic Control as is required. A drain plug 9 is provided immediately adjacent the inlet and outlet as well as the bight portions 7 to facilitate drainage of the system.

The mass flow measurement device is supported in depending relation from the aircraft being monitored, the mounting brace 20 associated therewith having a mounting brace first section 23 and a mounting brace second section 24. More particularly, the mounting brace first section 23 includes a horizontal support rod 26 upon which is disposed first and second leg support braces 22 having a curved top surface adapted to receive the first and second legs 2 and 12 respectively of the mass flow measuring device. The legs 2 and 12 are further constrained by means of first and second leg support caps 21 overlying the leg support bases 22. Suitable fasteners are associated therewith to preclude unwanted migration of the legs 2 and 12. The first section 23 includes upwardly extending tangs 27 at extremities of the horizontal support rod 26. These tangs 27 support in turn the mounting bracket second section 24 which is adapted to depend from the aircraft structure in general and a door support bracket in particular. The mounting bracket second section 24 includes a horizontal member 28 fastened to the aircraft and a vertical leg 29 allowed to be placed in registry with one tang 27. Another leg 30 on an end of the horizontal leg 28 remote from the vertical leg 29 has a downwardly and outwardly angulated linear portion thereafter bending into a portion substantially vertical and parallel to the vertical leg 29. This leg 30 also overlies the other of the two tangs 27. Overlapping sections of the tang and legs 29 and 30 are interconnected by means of fastening knobs 25 having threaded shaft adapted to be threadedly secured through bores on the legs and tangs to accomodate these knob shafts 25. Actual installation time for this device 10 ranges between twenty to thirty minutes. A support pallet 33 may be provided in underlying relationship to the device 10.

Figure 7:
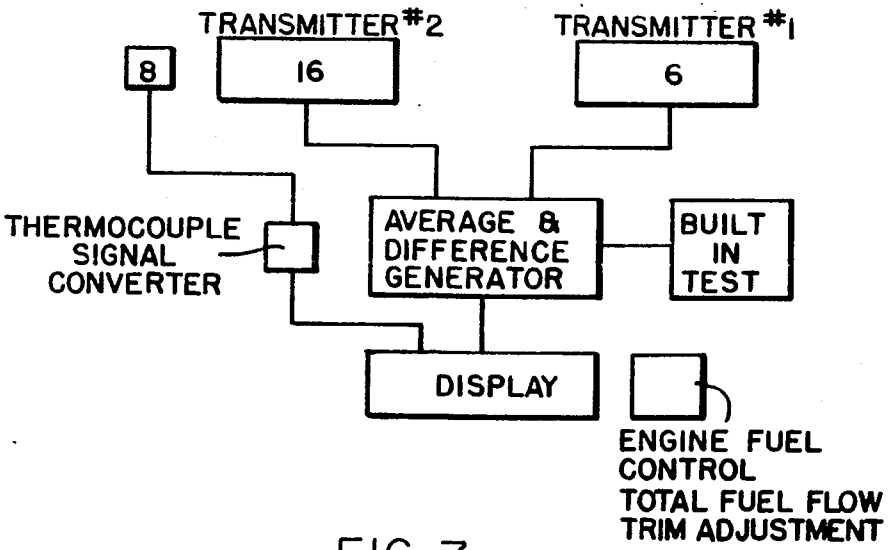
FIG. 7 is a block diagram correlating the flow transmitters with a display for use with the aircraft.

FIG. 7 depicts a block diagram of the transmitters and temperature sensors which are operatively coupled to provide readouts at a remote location, perferably adjacent the engine being trimmed so that technicians can benefit from data displayed on an instrumentality driven by the transmitters and sensors. More particularly, it is desired that the transmitters be initialized by calibration to compensate for the fuel temperature perceived by the temperature sensors 8. Each transmitter samples the fuel flowing therethrough at the rate of 48 times per second, and this data is stored for an average display periodically. In a specific embodiment, the samples taken at one or nine second time periods are displayed to respectively reflect transient position and engine trim position. Values generated from the first and second transmitter are displayed as an average wherein the readout of each transmitter is added and divided by two. In addition, it is desired to provide a further display reflecting the difference between the transmitter 6 and transmitter 16 and the associated algebraic sign therewith to be assured that the average readout is not the result of two widely disparate readings.

The display device includes a built-in test (BIT) feature which when activated generates a known synchro input angle and a 400 Hz reference input to both transmitter processors such that a known output on the displays can be obtained and the time between update indications can be verified, as well as the offset operation (difference).

In use and operation therefore, the mass flow measurement device 10 is first suspended from a support structure from the aircraft. Typically, the mounting brace 20 is dependent from a door structure of the aircraft and the mass flow measurement device including the closed loop is disposed in a substantially horizontal plane. The normal path of the fuel flow from an onboard storage site to the engine is interrupted immediately preceding the engine and is connected to the measurement device 10 as described hereinabove. The device is thereafter operated with initialization as dictated by the thermocouple 8 and the built-in tester. The technicians, utilizing the output data derived from the average from the two transmitters, are readily capable of trimming the engine well within the manufacturer's specification to obviate the problems associated with under and over trimming during the augmented thrust power settings.

Moreover, having thus described the invention it should be apparent that numerous structural modifications are contemplated as being a part of this invention as set forth hereinabove and as defined hereinbelow by the claims.

What is claimed is:

1. A flow measurement device comprising in combination:

a flow path, a mass flow transmitter disposed in said flow path, and means for altering a pattern of fluid flow in a section of said flow path immediately preceding said transmitter, whereby fluid entering said transmitter is substantially constant in flow rate and uniform in character to provide accurate flow measurement.

2. The device of claim 1 wherein said altering means includes a flow straightener preceding said mass flow transmitter including a corrugated material rolled into a spiral disposed in said flow path.

3. The device of claim 2 wherein said corrugated spiral is held in a fixed position in said flow path.

4. The device of claim 2 including at least one perforated plate downstream from said altering means for further fluid flow conditioning, said perforated plate interposed between said mass flow transmitter and said altering means.

5. The device of claim 4 wherein two said perforated plates are provided between said altering means and said flow transmitter, one said perforated plate spaced from the other to define a mixing chamber therebetween.

6. The device of claim 5 wherein three said perforated plates are provided, said third plate spaced from said first and second plates to define two mixing chambers.

7. A device for assisting in trimming fuel flow in an aircraft engine or the like by monitoring fuel mass flow rate just prior to introduction into the engine comprising in combination:

a flow loop provided with means for removeable connection to an existing engine fuel line so that said flow loop is interposed in said fuel line, fuel flow measuring means in said loop reflecting fuel mass flow rate admitted to the engine to aid in engine trimming, and means for standardizing fuel flow characteristics upstream said fuel flow measuring means.

8. The device of claim 7 wherein said standardizing means includes a flow straightener preceding said mass flow transmitter including a corrugated material rolled into a spiral disposed in said flow path.

9. The device of claim 8 wherein said corrugated spiral is held in a fixed position in said flow path.

10. The device of claim 8 including at least one perforated plate downstream from said standardizing means for further fluid flow conditioning, said perforated plate interposed between said mass flow transmitter and said standardizing means.

11. The device of claim 10 wherein two said perforated plates are provided between said standardizing means and said flow transmitter, one said perforated plate spaced from the other to define a mixing chamber therebetween.

12. The device of claim 11 wherein three said perforated plates are provided, said third plate spaced from said first and second plate to define two mixing chambers.

13. In a fuel trimming device for an engine: display means adjacent the engine reflecting engine mass flow rate and means operatively connected to said display means and removably connected to a source of fuel supplied to and immediately preceding the engine for monitoring the mass flow rate.

14. In the fuel trimming device of claim 13 wherein said means for monitoring the mass flow rate includes a flow path, a mass flow transmitter disposed in said flow path, and means for altering a pattern of fluid flow in a section of said flow path immediately preceding said transmitter, whereby fluid entering said transmitter is substantially constant in flow rate and uniform in character to provide accurate flow measurement.

15. The device of claim 14 wherein said altering means includes a flow straightener preceding said mass flow transmitter including a corrugated material rolled into a spiral disposed in said flow path.

16. The device of claim 15 wherein said corrugated spiral is held in a fixed position in said flow path.

17. The device of claim 15 including at least one perforated plate downstream from said altering means for further fluid flow conditioning, said perforated plate interposed between said mass flow transmitter and said altering means.

18. The device of claim 17 wherein two said perforated plates are provided between said altering means and said flow transmitter, one said perforated plate spaced from the other to define a mixing chamber therebetween.

19. The device of claim 18 wherein three said perforated plates are provided, said third plate spaced from said first and second plate to define two mixing chambers.

20. A method for trimming an aircraft engine with respect to fuel use including the steps of:

interposing a flow loop in the normal fuel flow path to the engine, providing the flow loop with a pair of flow measuring devices, standardizing the flow rate and characteristics of fuel upstream each flow measuring device, averaging the reading of the pair periodically, and displaying the obtained average.

21. The method of claim 20 including determining the difference between the readings of each of the flow measuring devices and displaying the difference between the pair when the average of the pair is being displayed.

22. The method of claim 21 including initially testing the calibration of the flow measuring devices for accuracy.

23. The method of claim 22 including correcting the reading of the mass flow measuring devices for temperature.

24. The device of claim 6 wherein said flow path is of substantially U-shaped configuration including first and second legs, a bight portion therebetween, distal ends of said legs remote from said bight portion provided with means for removably fastening said flow path to the fluid and a second said flow straightener preceding a second said transmitter both provided in said second leg.

25. The device of claim 12 wherein said flow loop is of substantially U-shaped configuration including first and second legs, a bight portion therebetween, distal ends of said legs remote from said bight portion provided with means for removably fastening said flow loop to the fuel and a second said flow straightener preceding a second said transmitter both provided in said second leg.

26. The device of claim 19 wherein said flow path is of substantially U-shaped configuration including first and second legs, a bight portion therebetween, distal ends of said legs remote from said bight portion provided with means for removably fastening said flow path to the fuel and a second said flow straightener preceding a second said transmitter both provided in said second leg.

27. The device of claim 26 wherein said bight portion includes temperature sensing means coupled to said transmitter for biasing and means along the flow path for fluid drawing.

28. The device of claim 25 wherein said bight portion includes temperature sensing means coupled to said transmitter for biasing and means along the flow loop for fuel drawing.

29. The device of claim 24 wherein said bight portion includes temperature sensing means coupled to said transmitter for biasing and means along the flow path for fuel drawing.

30. A mounting bracket for a fuel flow measuring device comprising in combination:

first and second portions, means for interconnecting said portions said first portion of inverted U-shaped configuration including means for depending from an aircraft structure, said second portion including shackle means for constraining said device thereto.

31. The device of claim 6 including a mounting bracket for a fuel flow measuring device comprising in combination: first and second portions, means for interconnection said portions, said first portion of inverted U-shaped configuration including means for depending from an aircraft structure, said second portion including shackle means for constraining said device thereto.

32. The device of claim 12 including a mounting bracket for a fuel flow measuring device comprising in combination: first and second portions, means for interconnecting said portions, said first portion of inverted U-shaped configuration including means for depending from an aircraft structure, said second portion including shackle means for constraining said device thereto.

33. The device of claim 19 including a mounting bracket for a fuel flow measuring device comprising in combination: first and second portions, means for interconnecting said portions, said first portion of inverted U-shaped configuration including means for depending from an aircraft structure, said second portion including shackle means for constraining said device thereto.

* * * * *